United States Patent
Geiger

Patent Number: 5,695,711
Date of Patent: Dec. 9, 1997

[54] DEVICE FOR TRANSPORTING A PARISON FROM THE TUBE FORMING HEAD TO THE BLOW MOLD OF A BLOW MOLDING MACHINE

[75] Inventor: Albert Geiger, Garmisch-Partenkirchen, Germany

[73] Assignee: Verwaltungsgelellschaft Geiger Technik GmbH, Garmisch-Partenkirchen, Germany

[21] Appl. No.: 563,569

[22] Filed: Nov. 28, 1995

[30] Foreign Application Priority Data

Nov. 28, 1994 [DE] Germany .......... 44 42 252.0

[51] Int. Cl.⁶ ............................. B29C 49/04
[52] U.S. Cl. .............. 264/540; 425/532; 425/534
[58] Field of Search ................... 264/531, 540; 425/532, 534

[56] References Cited

U.S. PATENT DOCUMENTS

| 4,777,006 | 10/1988 | Wenger et al. | 264/531 |
| 5,288,224 | 2/1994 | Yamamura et al. | 425/532 |
| 5,454,635 | 10/1995 | Geiger | 425/534 |

FOREIGN PATENT DOCUMENTS

| 3737453 | 5/1988 | Germany | 264/531 |
| 53-010659 | 1/1978 | Japan | 264/540 |
| 3-261534 | 11/1991 | Japan | 425/534 |

*Primary Examiner*—Catherine Timm
*Attorney, Agent, or Firm*—Juettner Pyle Lloyd & Piontek

[57] ABSTRACT

The parison transporting device includes a straight mold trough formed by pins which are arranged relative to one another in V-shaped configuration when viewed in cross-section and which can be retracted into pneumatic cylinders to open the bottom of the mold trough. The parison transporting device is moved in the tube receiving position in straight fashion below the tube forming head of a blow molding machine to receive a tubular parison. The parison transporting device is subsequently moved to the blow mold. It is moved there over the mold cavity in such a manner that the tubular member inside the mold trough is positioned with successive sections above the mold cavity, the respectively aligning sections of the tubular piece being released by withdrawing pairs of pins and being dropped side by side into the mold cavity.

13 Claims, 2 Drawing Sheets ial pieces, with a tube forming head which discharges a heat-moldable tube, a parison transporting device having an upwardly open mold trough whose bottom can be opened, and with a blowing station having a divided blow mold including a mold cavity in which the tube is blown up, the parison transporting device first receiving the tube and transporting the same to the blow mold, to which end the parison transporting device can be moved between the tube forming head and the blowing station.

DEVICE FOR TRANSPORTING A PARISON FROM THE TUBE FORMING HEAD TO THE BLOW MOLD OF A BLOW MOLDING MACHINE

BACKGROUND OF THE INVENTION

The present invention relates to a parison transporting device for a blow molding machine for producing hollow plastic articles bent once or several times, for instance tubular pieces, with a tube forming head which discharges a heat-moldable tube, a parison transporting device having an upwardly open mold trough whose bottom can be opened, and with a blowing station having a divided blow mold including a mold cavity in which the tube is blown up, the parison transporting device first receiving the tube and transporting the same to the blow mold, to which end the parison transporting device can be moved between the tube forming head and the blowing station.

When hollow plastic articles, such as tubular pieces which are bent once or several times, are produced, it is difficult to insert the tubular parison into the blow mold. Since the mold cavity of the blow mold which corresponds to the hollow plastic article to be produced has more than one axis, and since these axes are at angles with one another in space, i.e., the mold cavity may consist of a plurality of sections extending upwards and downwards towards both sides, the part of the blow mold that is either in a horizontal position or in an inclined position must be moved back and forth and also up and down accordingly while a tubular parison is being discharged in straight fashion, or these movements must be performed by the extruder when the mold is at a standstill. Since either the whole mold closing support including the blow mold or the extruder with the associated tube forming head must be moved in three axes perpendicular to one another, considerable weights must be moved, as both the mold closing supports and the extruders themselves weigh several tons even in the case of small machines.

To avoid movement of one of the two heavy subassemblies extruder/tube forming head or mold dosing support with blow mold, DE 43 05 735 C1 suggests a lightweight interim transporting mold which includes an upwardly open mold trough whose bottom can be opened. This interim transporting mold receives the tube exiting from the tube forming head and is then moved to the blowing station to hand over the tube to the blow mold. The interim transporting mold is of little weight, one of the reasons being that no closing forces have to act on it and no cooling channels have to be accommodated therein, so that it can be moved with considerable smaller efforts than one of the subassemblies extruder/tube forming head or mold dosing support with blow mold.

The mold trough of the interim transporting mold according to DE 43 05 735 has the shape of the mold cavity of the blow mold. To receive the tube exiting from the tube forming head, the interim transporting mold is moved in its tube receiving position in both horizontal directions (X- and Y-axes) and lifted or lowered in vertical direction until the whole tube piece rests in the mold trough. The interim transporting mold is subsequently positioned above the lower part of the blow mold such that its mold trough lies vertically above the mold cavity of the blow mold, whereupon the bottom of the mold trough is opened, so that the parison drops into the mold cavity.

Use of such an interim transporting mold has turned out to be optimum in practice. However, with such a prior-art solution for the problem of avoiding movement of large weights, an interim transporting mold corresponding to the associated mold cavity has to be made for each blow mold, since the mold trough thereof has to be adapted exactly to the shape of the mold cavity of the blow mold.

SUMMARY OF THE INVENTION

It is the object of the present invention to provide a parison transporting device of a more simple structure for a blow molding machine and to maintain the above-mentioned advantages.

It is another object of the present invention to indicate a method for producing hollow plastic articles, which are bent once or several times, at low costs.

In accordance with the invention, there is suggested a blow molding machine including a parison transporting device whose mold trough is made straight at least when viewed from above, and which is moved in the tube receiving position in correspondingly straight fashion below the tube forming head to receive the tubular piece. The parison transporting device is then moved to the blow mold such that an end section of the parison is preferably positioned in the mold trough of the transporting device above an end section of the mold cavity of the blow mold. In this position, the bottom section is opened in the area in which the mold trough is vertically positioned above the mold cavity, so that a corresponding section of the tubular piece drops into the mold cavity. The transporting device is subsequently moved over the blow mold such that continuously successive sections of the mold trough are in vertical alignment with successive sections of the mold cavity, whereupon the associated bottom sections of the mold trough are successively opened, so that the whole tubular piece is sectionwise inserted into the mold cavity. The respective length of the sections depends on the course of the curvature of the mold cavity.

This has the effect that a single parison transporting device can be used for blow molds having different mold cavities. A special advantage is that the moving mechanism for the transporting device does not become more complicated, since the triaxial movement of the interim mold just takes place at a different time, namely when the parison is handed over to the blow mold.

In accordance with another development of the invention, the mold trough extends in a substantially horizontal direction. This gives the mold trough an especially simple structure. However, it is also within the scope of the invention that the mold trough is adapted in vertical direction substantially to the height extension of the mold cavity to effect a length compensation when the tube is handed over.

The transporting device is moved in the tube receiving position preferably in horizontal direction. However, it is also within the scope of the invention that the transporting device is moved in straight fashion at an angle relative to the horizontal to receive the tubular parison.

When the tube is handed over to the blow mold, the transporting device is moved such that the tubular parison is successively positioned and released above the mold cavity. In some instances, it may suffice to move the transporting device in a horizontal plane in both directions, i.e., in the direction of an X-axis and a Y-axis. Depending on the course of the mold cavity, it is possible to lift or lower the transporting device in the tube discharging position, i.e., to move it in the Y-direction, and it is also within the scope of the invention to pivot the transporting device from its horizontal position, i.e., to make a tilting movement.

The transporting device can be moved by any suitable movement mechanism, for instance, by a robot. To control its movement, a corresponding template may, for instance, be followed. Suitable movement and control mechanisms are known to the skilled artisan and are not the subject matter of the present invention.

Closing elements which are successively opened to release the tube piece by piece from the mold trough are arranged on the bottom of the mold trough of the transporting device. To this end, the bottom of the mold trough may have arranged thereon transversely extending pins which can preferably be retracted by means of pneumatic cylinders, so that the tube can exit from the bottom of the mold trough. The pins can, for instance, be held in a pivotable manner as well. Other drive means instead of the above-mentioned pneumatic cylinders are within the scope of the invention.

The pins may be arranged at both sides of the mold trough and may extend at an angle relative to one another, so that the bottom is given a V-shaped form when viewed in cross-section. This is conducive to an exact positioning of the tubular parison in the mold trough of the transporting device and to a locally exact discharge to the mold cavity, since the tube cannot slip laterally when the closing elements are retracted or pivoted.

Instead of the pins, doors which are next to each other may also be provided for closing the bottom in the closed state substantially completely and for effecting a support of the tube over the whole surface. These doors may also be arranged at both sides of the mold trough and may form a V-shaped receiving trough.

Other features of the invention will become apparent from the following description of a preferred embodiment of a blow molding machine, wherein:

DESCRIPTION OF THE PREFERRED EMBODIMENTS

Figure 1:
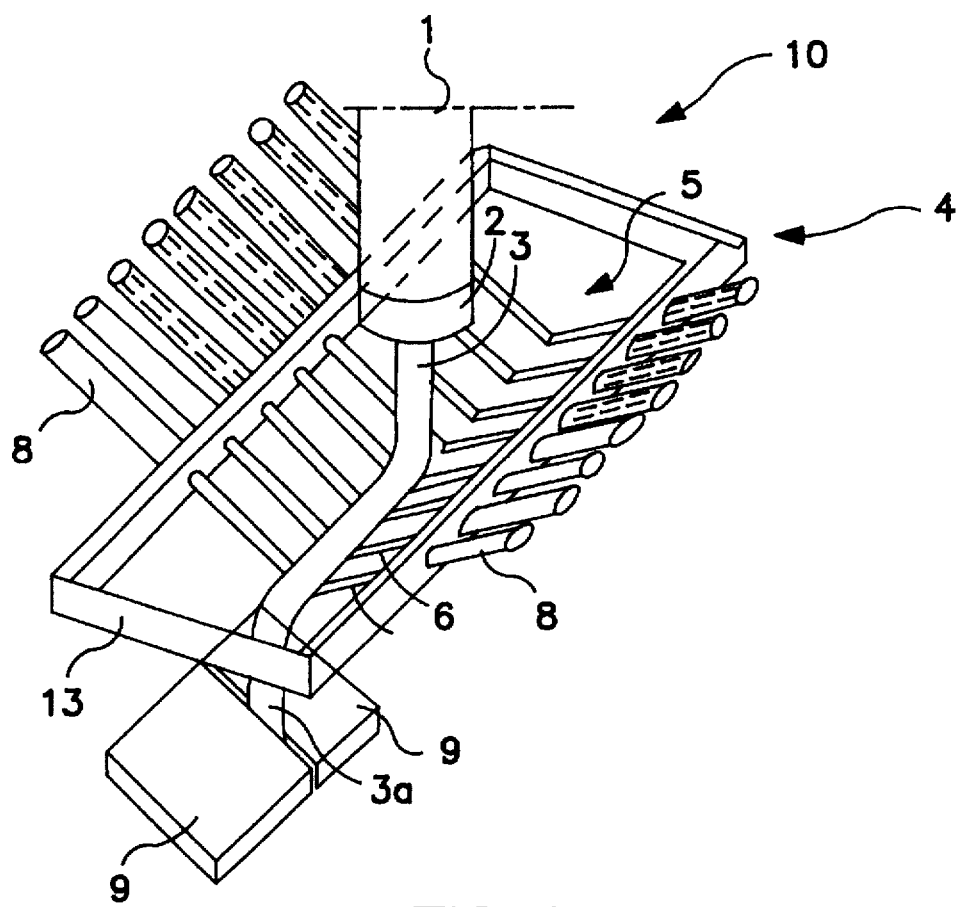
FIG. 1 is a perspective view of a parison transporting device which is arranged below a tube forming head and is just receiving a tubular parison.

FIG. 1 shows a tube forming head 1 which is arranged downstream of an extruder and from whose nozzle, which is positioned in a nozzle ring 2, a heat-moldable tubular piece 3 is continuously squirted downwards.

Figure 2:
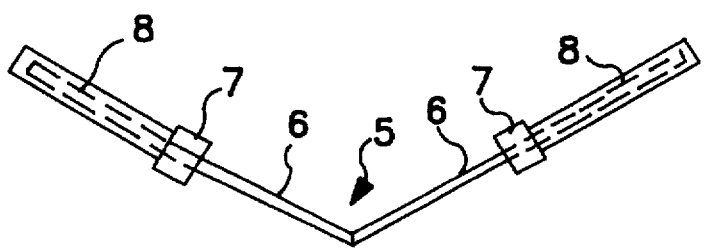
FIG. 2 is a purely diagrammatic cross-section through the transporting device of FIG. 1.

The tubular piece 3 is received by a parison transporting device 4 (only shown in part) in a mold trough 5 of straight axial extension. The bottom of mold trough 5 is formed by pins 6 which are spaced apart at short intervals and which, as clearly shown in FIG. 2, engage into pneumatic cylinders 8 secured at both sides to thin rectangular tubes 7. Pins 6 extend at an angle relative to each other, as shown in FIG. 2, so that mold trough 5 has a substantially V-shaped cross-section. In the extended state, pins 6 close the bottom of mold trough 5. When being retracted, they release the bottom opening of mold trough 5, so that tube 3 can exit downwards. The lateral rectangular tubes 7 form a rigid frame together with transversely extending rectangular tubes 13 which are arranged at some distance from the mold trough 5 formed by pins 6.

Figure 3:
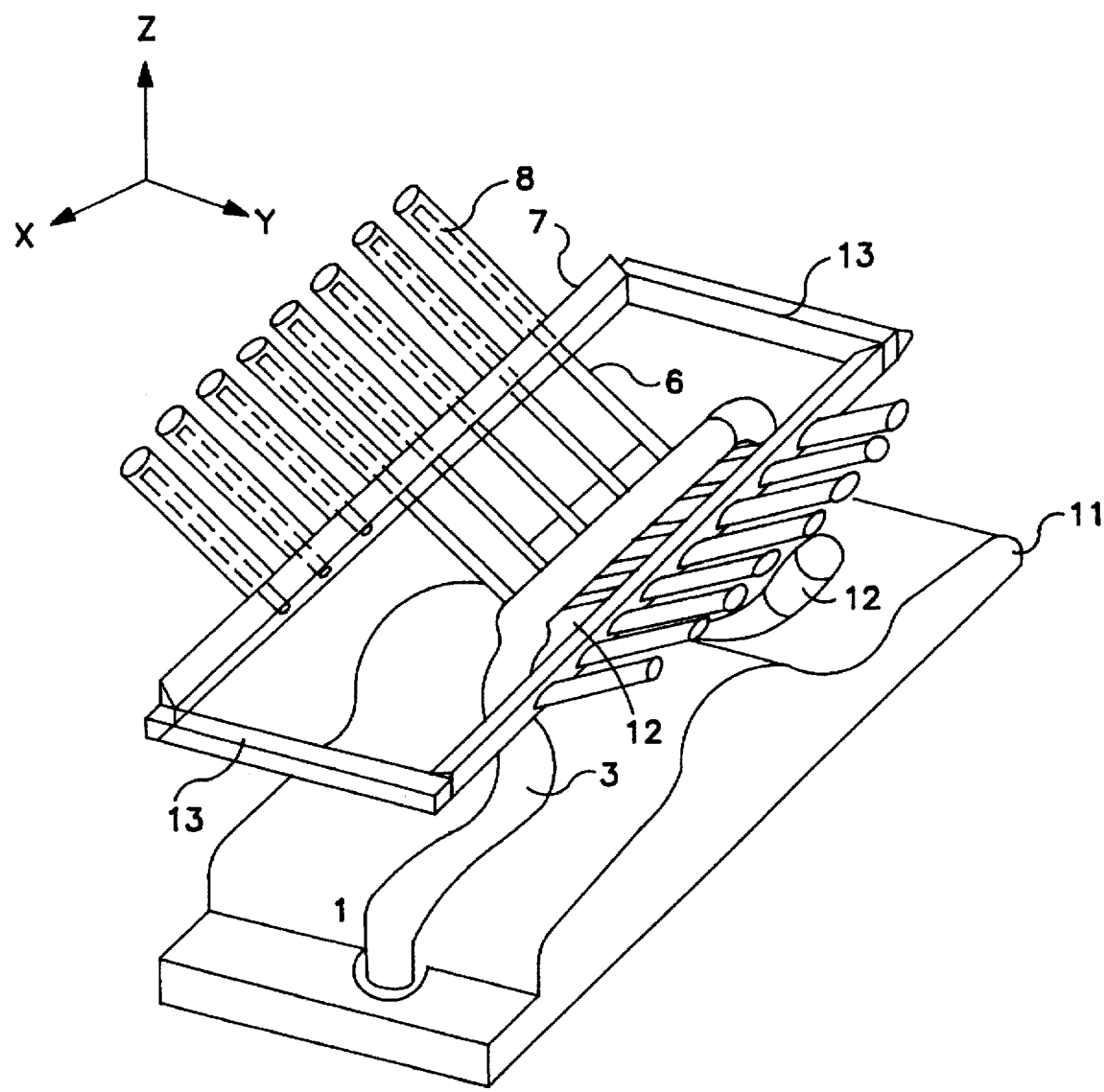
FIG. 3 is a perspective view of the transporting device when a parison is being transferred into the mold cavity of a blow mold.

The transporting device 4 is lightweight and need not be made from a material having such a high quality as does the blow mold. Its frame which consists, for instance, of thin rectangular tubes can be moved back and forth on the arm of a robot or on rollers or wheels (not shown) along rails (also not shown) with the aid of a small-sized simple motor, such as a servomotor, between the tube receiving position and the blow mold shown in FIG. 3.

One can see in FIG. 1 how the lower end 3a of the tubular piece 3 is squeezed and thus closed between two clamping plates 8, 8a which are displaceable in the horizontal plane. When tube 3 is being received, transporting device 4 is moved in straight fashion in the X-direction (arrow 10) until the whole tubular piece is received. While the tubular piece 3 is being discharged from the nozzle ring 2 and inserted into the transporting device moved in the direction of arrow 10, so-called "support air" which ensures that the tubular piece 3 does not collapse in mold trough 5 after its rear end has been squeezed by a further pair of clamping plates (not shown) is admitted into the tubular piece 3 through the nozzle of the tube forming head 1. The end of tubular piece 3 is separated from the subsequent tubular piece by squeezing said end.

After the tubular piece 3 has been inserted into preform 5, the latter is moved on its frame (not shown) in a direction perpendicular to the X-direction over the lower part 11 of a blow mold including mold cavity 12 to such an extent until the from section of tubular piece 3 is vertically positioned above the front end section 13 of mold cavity 12. In this position, the first pair of opposite pins 6 (or a plurality of pin pairs) are retracted into the associated pneumatic cylinders 8, whereby a small tube section is released downwards and can drop into mold cavity 12. The transporting device is subsequently moved continuously in X-, Y-, Z-directions such that successive longitudinal sections of tubular piece 3 are positioned along mold cavity 12 such that they are inserted into the mold cavity by timed progressive retraction of the successive pairs of pins 6. It is also possible to tilt the transporting device 4 about one or a plurality of axes X, Y or Z if this is required for a perfect insertion of the tubular piece into the mold cavity.

When the whole tubular piece 3 has been inserted into mold cavity 12, the transporting device 4 is again moved to the tube forming head 1, whereupon the blow mold 11 is closed by means of an associated upper member. Subsequently, air is preferably introduced by a blowing needle (not shown) into the parison for pressing the parison against the wall of mold cavity 12, whereby the desired hollow plastic article is formed.

What is claimed is:

1. Apparatus for blow molding of irregularly shaped tubular plastic articles, said apparatus comprising a tube forming means for extruding a heat moldable tube, a blow station containing a divided blow mold spaced from the tube forming means, and a transport means for transporting the tube from the tube forming means to the divided blow mold, said transport means comprising an upwardly open trough having a bottom, a plurality of elements in the bottom of said trough movable between a closed and an open position, and means for moving said trough, when said trough is above said divided blow mold, in a plurality of directions while moving successive of said elements from said closed to said open position, to deposit said tube into said divided mold.

2. The apparatus of claim 1 wherein said trough is movable below said tube forming means in a linear direction.

3. The apparatus of claim 1 wherein said trough is movable in substantially a horizontal direction.

4. The apparatus of claim 1 wherein said trough is movable over said divided blow mold in perpendicular horizontal directions.

5. The apparatus of claim 3 wherein said trough is additionally movable in a vertical direction.

6. The apparatus of claim 1 wherein said trough is tiltable above said divided blow mold.

7. The apparatus of claim 1 wherein said elements comprise pins.

8. The apparatus of claim 7 additionally comprising means for pneumatically retracting said pins.

9. The apparatus of claim 7 wherein said pins are pivotally mounted.

10. The apparatus of claim 7 wherein said trough has opposed sides, and said pins are mounted in said sides.

11. The apparatus of claim 10 wherein said pins are inclined downwardly toward each other in a U-shaped configuration.

12. The apparatus of claim 1 wherein said elements comprise a plurality of adjacent doors.

13. Method for the blow molding of an irregularly shaped article, wherein a tube of plastic material is extruded and moved over a divided blow mold having mold sections, said method comprising the steps of depositing an extruded tube into an upwardly open trough having a closed bottom, moving the trough and tube to a divided blow mold, and opening successive sections of said closed bottom while moving the trough in a plurality of directions over said divided blow mold to deposit the tube into said mold sections.

* * * * *